United States Patent Office 3,001,797
Patented Sept. 26, 1961

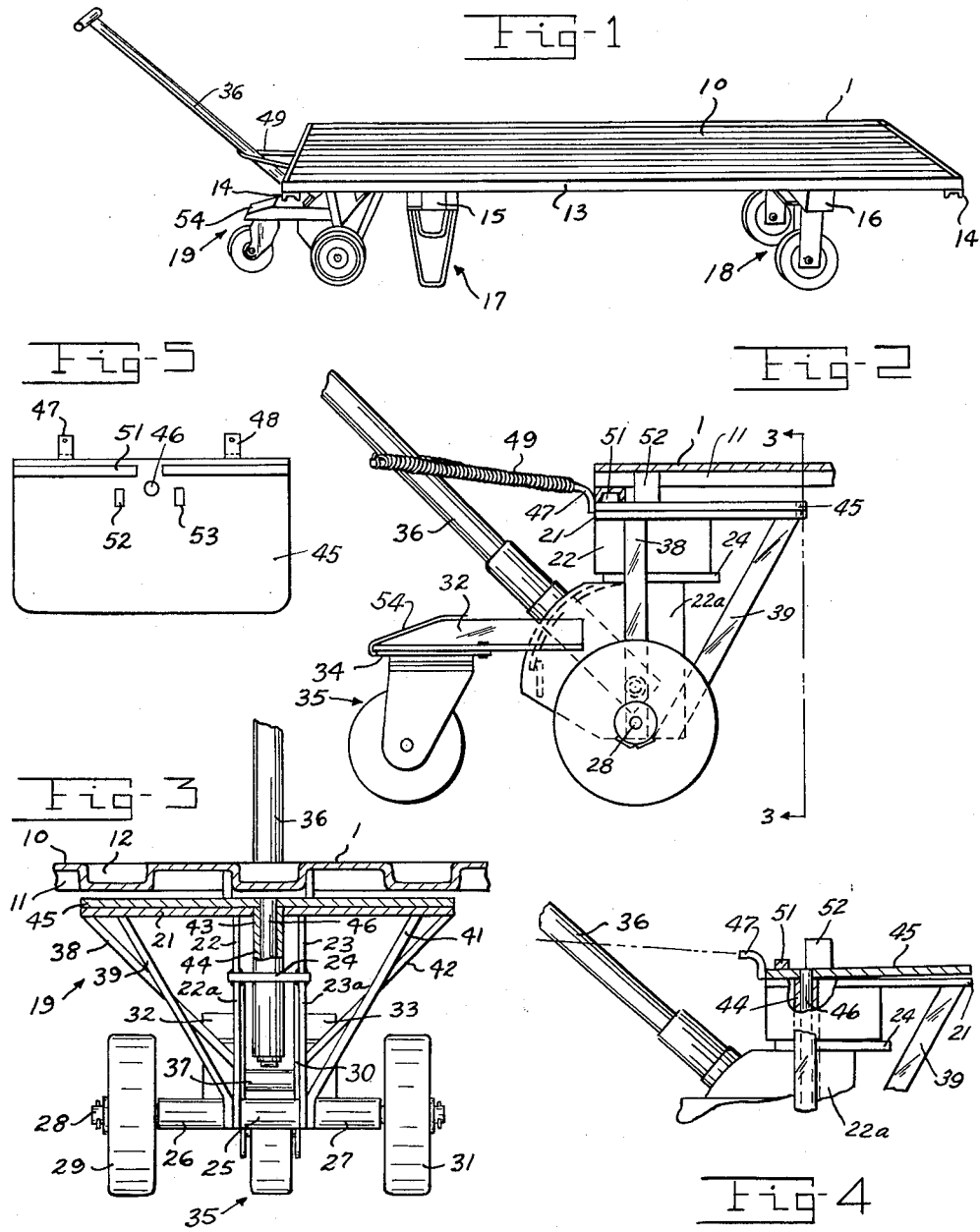

3,001,797
PALLET TRANSPORTING APPARATUS
John W. Kappen, 243 Kenwood Ave., Dayton, Ohio
Filed Sept. 30, 1958, Ser. No. 764,358
7 Claims. (Cl. 280—46)

This invention relates to material handling equipment, and particularly to skids or pallets and to the spotting thereof.

The invention has especial, although not limited, reference to a skid spotter in the form of a portable manually operated tractor-like device by which loaded or unloaded pallets may be moved about and selectively positioned on a warehouse floor or the like.

The object of the invention is to simplify the construction as well as the means and mode of operation of pallet transporting apparatus or spotters, whereby such spotters may not only be economically manufactured, but will be more efficient and satisfactory in use, adaptable to a wide variety of applications, and be unlikely to get out of order.

A further object of the invention is to present a new combination of a skid or pallet and spotting device therefor in which the skid and the spotter are especially adapted for detachable engagement one with another.

Another object of the invention is to present a spotting device for use with skids or pallets characterized by a simple compact construction lending itself to easy handling and movement by the hand of an operator.

A further object of the invention is to incorporate into a spotting device as described swivel means facilitating turning and non-linear movements of the pallet.

A further object of the invention is to provide a pallet spotter possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention.

FIG. 1 is a view in perspective of a skid or pallet and a spotting device interengaged therewith, in accordance with the instant inventive concept.

FIG. 2 is a view of the skid spotter in side elevation, with the handle partly broken away and showing the interengagement with the skid.

FIG. 3 is a view in cross-section taken substantially along the line 3—3 of FIG. 2.

FIG. 4 is a detail, fragmentary view like FIG. 2 and partly broken away to show a detail of the mounting of the swivel means, and FIG. 5 is a top plan view of a swivel plate comprised in the swivel means of the skid spotter.

Like parts are indicated by similar characters of reference throughout the several views.

Referring to the drawing, while the inventive concept is not concerned with details of the skid or pallet construction, it is particularly adapted for use with a "live" or "semi-live" type of skid, that is one adapted for freely rolling motion or one which can be made freely to roll by lifting one end thereof. In the illustrated instance, as shown in FIG. 1, the pallet is of semi-live construction. It comprises a flat, bed-like portion 10 made of sheet metal and corrugated as shown in FIG. 3 to define downwardly facing channels 11 and upwardly facing channels 12 in alternating relation to one another. Rigid marginal pieces 13 are attached to the bed portion 10 and on the underside of the bed portion at each end thereof is a downwardly facing channel bar 14. Also on the underside of the bed portion, and in transverse underlying relation thereto are battens 15 and 16. The former provides a detachable mounting for a foot rest assembly 17 while the latter provides a similar mounting for a wheel assembly 18. The construction of the pallet accordingly is such that the foot assembly 17 and wheel assembly 18 hold the bed portion 10 relatively elevated and in a position approximately parallel to the floor surface. Also, the frictional engagement of the foot rest 17 with such floor surface tends to resist movement of the pallet so that after it has been located or "spotted" it will tend to remain so positioned. Movement of the pallet from one place to another is accomplished by raising slightly that end of the skid supported by the foot rest 17. The skid is thus then supported only upon the wheels 18 and so may be moved freely to a new location and there again let down for purposes of storage, loading or unloading. In respect of the foot rest 17 and wheels 18, the skid lends itself to ready modification and may be converted from a semi-live to a live or to a fully stationary skid merely by a suitable interchange of foot rest and wheel assemblies.

The instant invention has in view of a portable hand operated spotter 19, shown in FIG. 1 engaged with the skid and as the parts appear just prior to or immediately after a movement of the skid for respotting. The spotter comprises a frame which includes a horizontal top plate 21 and vertically disposed, spaced apart frame plates 22 and 23 dependent from the underside of plate 21 at about the middle thereof. The plates 22 and 23 terminate at their bottom edges in a transverse plate 24 which along with plates 22 and 23 comprises an approximately U-shaped support for the transversely extended top plate 21. The described support rests on upstanding auxiliary frame plates 22a and 23a which are in effect extensions of the plates 22 and 23, the whole of the plate assembly being joined into a unitary structure. At their lower ends, the plates 22a and 23a merge with a transversely extending part of the frame in the form of an axle bearing 25. Extensions 26 and 27 of the axle bearing project through and beyond the frame elements 22a and 23a. An axle 28 is rotatably mounted in the bearing 25—27. Wheels 29 and 31 are mounted on opposite ends of the axle 28.

Projecting longitudinally of the spotter and secured to opposite sides of the frame plates 22a and 23a are brackets 32 and 33. Extending between the brackets 32 and 33 is a mounting plate 34 while attached to the underside of the mounting plate 34 is a caster assembly 35. The caster assembly accordingly cooperates with the wheels 29 and 31 in supporting the spotter for rolling movement and for facile turning, reversing and like movements.

Also attached to the frame elements 22a and 23a is a handle 36 inclining upwardly from the spotter proper for easy manipulation by a standing or walking operator. The lower end of the handle may be rigidly secured to the frame, or adjustably attached thereto to be fixed to the frame in selected positions of angular adjustment. In the illustrated instance, the handle is received at its lower end in a yoke 30 pivotally mounted on a stud 37 supported between the frame elements 22a and 23a. Releasable means (not shown) on the handle-yoke assembly cooperates with a notched periphery on the frame in order selectively to lock the handle to the frame. When so locked, it will be understood, a downward force applied to the outer end of the handle serves to raise the wheeled end of the spotter about the caster assembly 35. Similarly, raising of the outer end of the handle will rock the spotter by lifting the caster end from the floor.

The top plate 21 of the frame extends a substantial distance from side to side of the frame supports 22 and 23 as well as a substantial distance forwardly thereof. Its overhanging portions are supported by braces 38, 39, 41 and 42. The upper surface of top plate 21 is flat and approximately planar. Opening through such upper surface at a point between the plates 22 and 23 is an opening 43. An open ended socket-like portion 44 has one end received in opening 43 and extends downwardly between the plates 22 and 23 and 22a and 23a. Resting upon the upper surface of top plate 21 in intimate, contacting relation thereto, is a swivel plate 45 having dimensions approximately corresponding to those of top plate 21. A pivot pin 46 is mounted in the swivel plate 45 and is received in the socket 44. The swivel plate accordingly is held positively against lateral motion relatively to the plate 21 but may move freely in a rotary sense about the socket 44 as a pivot. On what may be considered the rear edge of the swivel plate 45, on opposide sides of the pivot pin 46, are projecting tabs 47 and 48 which serve as anchors for the ends of spring means 49 connected at their opposite ends to anchors on the handle 36. The arrangements is one tending to center or align the swivel plate upon the top plate but permitting relative oscillating movement thereof with a spring return.

Also on the swivel plate 45 are bar means 51 constituting a raised formation adapted to enter in a channel bar 14 on one end of the skid. Similarly, upstanding lugs 52 and 53 on swivel plate 45 are adapted to enter into longitudinal recesses 11 in the bed portion 10 of the skid on opposite sides of an upper depression 12. The wheeled mounting of the spotter device provides that with the skid resting on a level floor the height of the spotter is such as to place the bar means 51 into the channel member 14 and to place the lugs 52 and 53 in embracing relation to a recessed portion of the pallet bed as indicated. The spotter is accordingly locked to the skid at this time and pulling or pushing movements applied to the spotter are accompanied by like movements of the skid. The height of the spotter is such that with both wheels 29 and 31 and the caster assembly 35 at rest upon the floor the bar means 51 and the lugs 52 and 53 tend to project slightly above the plane of the lower part of the bed portion of the skid. Thus when inserted or interengaged with the skid as described, the one end of the skid is raised from the floor facilitating movement of the skid upon the wheels 18 in accompaniment with movement of the spotter. The engagement of the spotter with the pallet and disengagement therefrom are accomplished by rocking the spotter through the handle 36 in the manner previously described. Thus, by raising upward upon the handle 36 the swivel plate may be caused to enter beneath the bar 14 at one end of the skid. When the parts are restored, permitting the spotter to rock back to a normal position upon the floor, the bar means 51 is enabled in the course of such motion to interfit with the chanel 14, and as the motion continues to lift the skid. Disengagement is accomplished by a similar movement, as will be understood. The connection of the skid to the spotter enables the spotter to be readily guided through turning and non-linear movements without having correspondingly to turn the front end of the skid which is allowed to trail and to follow the movements of the spotter by rolling upon the wheels 18. A foot plate 54 extends across the front of the brackets 32 and 33 and assists in the manipulation of the spotter to engage it with portions of the skid. Bars 14 are provided at either end of the skid in order that the spotter may engage alternate ends thereof, depending upon the selection of under-supports provided for the skid.

The location of the bar means 51 and lugs 52—53 is such that the load of the elevated end of the skid is sustained over the axle 28, substantially to avoid instability and to permit the supported weight to be distributed over the wheels 29 and 31, the frame and the caster assembly.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A portable skid spotter, including a frame, wheels to support said frame for rolling movement, an axle installed in said frame to mount said wheels, a top plate on said frame in relatively elevated approximately parallel relation to the plane of said axle, the upper surface of said plate being approximately planar, a skid engaging swivel plate supported by said top plate in flush contacting relation to the upper surface thereof, a socket in said frame opening through the upper surface of said top plate, a pivot pin projecting from said swivel plate into said socket providing for pivotal swinging motion of the swivel plate in an adjacent parallel plane to said top plate and relatively thereto, and means yieldingly to maintain said swivel plate in a set position of pivotal adjustment.

2. A portable skid spotter according to claim 1, characterized in that said swivel plate has a configuration corresponding approximately to that of said top plate, said yielding means tending to maintain said swivel plate in a position of registry with said top plate.

3. A portable skid spotter according to claim 1, characterized by a handle attached to said frame, said yielding means having the form of springs attached at their one end ends to said swivel plate on opposite sides of said pivot pin and attached at their opposite ends to said handle.

4. Material handling equipment including a skid having longitudinally extending corrugations on its underside and a transversely disposed channel bar on its underside, a portable skid spotter including a frame, wheels on said frame, a handle attached to said frame to move the spotter about, a swivel plate pivotally mounted on said frame, and interengageable means on the upper surface of said swivel plate adapted to interfit with said longitudinal corrugations and said channel bar on said skid.

5. A portable skid spotter including, a frame, laterally spaced wheels supporting said frame, caster means projected forwardly of one end of said frame triangularly positioned with reference to said wheels and cooperating therewith to stabilize and facilitate the manipulation of said frame, a handle connected to said frame for manipulation thereof and tilting said frame on said wheels, a plate having one end pivotally mounted on said one end of said frame for relative swinging motion thereon and having means projected for interengaging skid means so as to inhibit relative rotative movement of the skid means with reference thereto.

6. A portable skid spotter including, a frame, laterally spaced wheels supporting said frame, caster means projected forwardly of one end of said frame triangularly positioned with reference to said wheels and cooperating therewith to stabilize and facilitate the manipulation of said frame, a handle connected to said frame for manipulation thereof and tilting said frame on said wheels, a plate pivotally mounted on said one end of said frame for relative swinging motion thereon and having means projected for interengaging skid means so as to inhibit relative rotative movement of the skid with reference thereto, and means connected to normally bias said swingably mounted plate to a predetermined position of adjustment with reference to said frame.

7. A portable skid spotter including a frame having wheels supporting it for rolling movement and handle means connected to project forwardly thereof, plate means swivelly mounted to one end on the upper extremity of said frame having fixed bar means vertically projected for engagement with skid means so as to inhibit relative rotative movement therebetween and means connected between said handle means and swivelly mounted plate means providing a relative bias to induce said frame means and swivelly mounted plate means to assume a predetermined relative position.

References Cited in the file of this patent

UNITED STATES PATENTS

| | | |
|---|---|---|
| 554,533 | Parent | Feb. 11, 1896 |
| 627,699 | Marston | June 27, 1899 |
| 1,150,773 | La Chall | Aug. 17, 1915 |
| 1,740,404 | Kalberer | Dec. 17, 1929 |
| 2,338,645 | James | Jan. 4, 1944 |
| 2,703,657 | Hudkins | Mar. 8, 1955 |
| 2,710,197 | Combs | June 7, 1955 |

FOREIGN PATENTS

| | | |
|---|---|---|
| 8,932 | Great Britain | of 1890 |
| 561,268 | Germany | Oct. 12, 1932 |
| 578,526 | Germany | June 15, 1933 |
| 475,746 | Great Britain | Nov. 25, 1937 |
| 583,725 | Great Britain | Dec. 30, 1946 |